UNITED STATES PATENT OFFICE.

RUDOLPH BERENDES, OF ELBERFELD, GERMANY, ASSIGNOR TO SYNTHETIC PATENTS CO., INC., OF NEW YORK, N. Y., A CORPORATION OF NEW YORK.

GALLOCARBOXYLIC-ACID COMPOUNDS.

1,150,654.  Specification of Letters Patent.  Patented Aug. 17, 1915.

No Drawing.  Application filed July 17, 1914. Serial No. 851,555.

*To all whom it may concern:*

Be it known that I, RUDOLPH BERENDES, doctor of philosophy, chemist, citizen of the German Empire, residing at Elberfeld, Germany, have invented new and useful Improvements in Gallocarboxylic-Acid Compounds, of which the following is a specification.

My invention relates to the manufacture and production of hitherto unknown gallocarboxylic acid compounds containing in their molecule iodin and bismuth. They can be obtained by either treating gallocarboxylic acid with bismuthoxyiodid or by treating with hydrogen iodid the basic bismuth salt of gallocarboxylic acid. The new compounds have proved to be valuable antiseptics and astringents. They are generally reddish-brown to gray powders insoluble in water, difficultly soluble in the usual organic solvents and yielding gallocarboxylic acid when treated with dilute hydrochloric acid.

In order to illustrate the new process more fully the following examples are given, the parts being by weight:—

Example 1: 214 parts of gallocarboxylic acid, 700 parts of bismuth-oxyiodid and water are mixed together to a fine pulp. This pulp is treated during two hours on a boiling water bath until unchanged gallocarboxylic acid can no longer be proved to be present in the mixture. Subsequently the precipitate is filtered off, washed with water, alcohol and dried. The product thus obtained is a red-brown powder, containing about 20 per cent. of iodin and 45 per cent. of bismuth. It is insoluble in water and difficultly soluble in ether, benzene, alcohol, ligroin, etc. The gallocarboxylic acid being set free therefrom upon treatment with dilute hydrochloric acid.

Example 2: 100 parts of the basic gallocarboxylate of bismuth are ground to a fine powder together with about 50 parts of hydrogen iodid, heating must be avoided. The product thus obtained is washed with water and dried. It is a grayish-green powder, insoluble in water and organic solvents such as alcohol, ligroin, ether, benzene, etc. It is decomposed by dilute hydrochloric acid.

I claim:—

1. The new compounds being chemically gallocarboxylic acid compounds containing in their molecule iodin and bismuth being generally reddish-brown to gray powders insoluble in water and difficultly soluble in the usual organic solvents; yielding gallocarboxylic acid upon treatment with dilute hydrochloric acid and having proved to be valuable antiseptics and astringents, substantially as described.

2. The new compound being chemically gallocarboxylic acid containing in its molecule bismuth and iodin; being a red-brown powder insoluble in water and soluble with difficulty in alcohol, ether, benzene, ligroin; which splits off gallocarboxylic acid upon treatment with dilute hydrochloric acid, containing about 20 per cent. of iodin and 45 per cent. of bismuth; being a valuable antiseptic and astringent; substantially as described.

In testimony whereof I have hereunto set my hand in the presence of two subscribing witnesses.

RUDOLPH BERENDES. [L. S.]

Witnesses:
  HELEN NUFER,
  ALBERT NUFER.